P. H. KELLS.
Mower.
No. { 117. / 1,221. }
Reissued Aug. 13, 1861
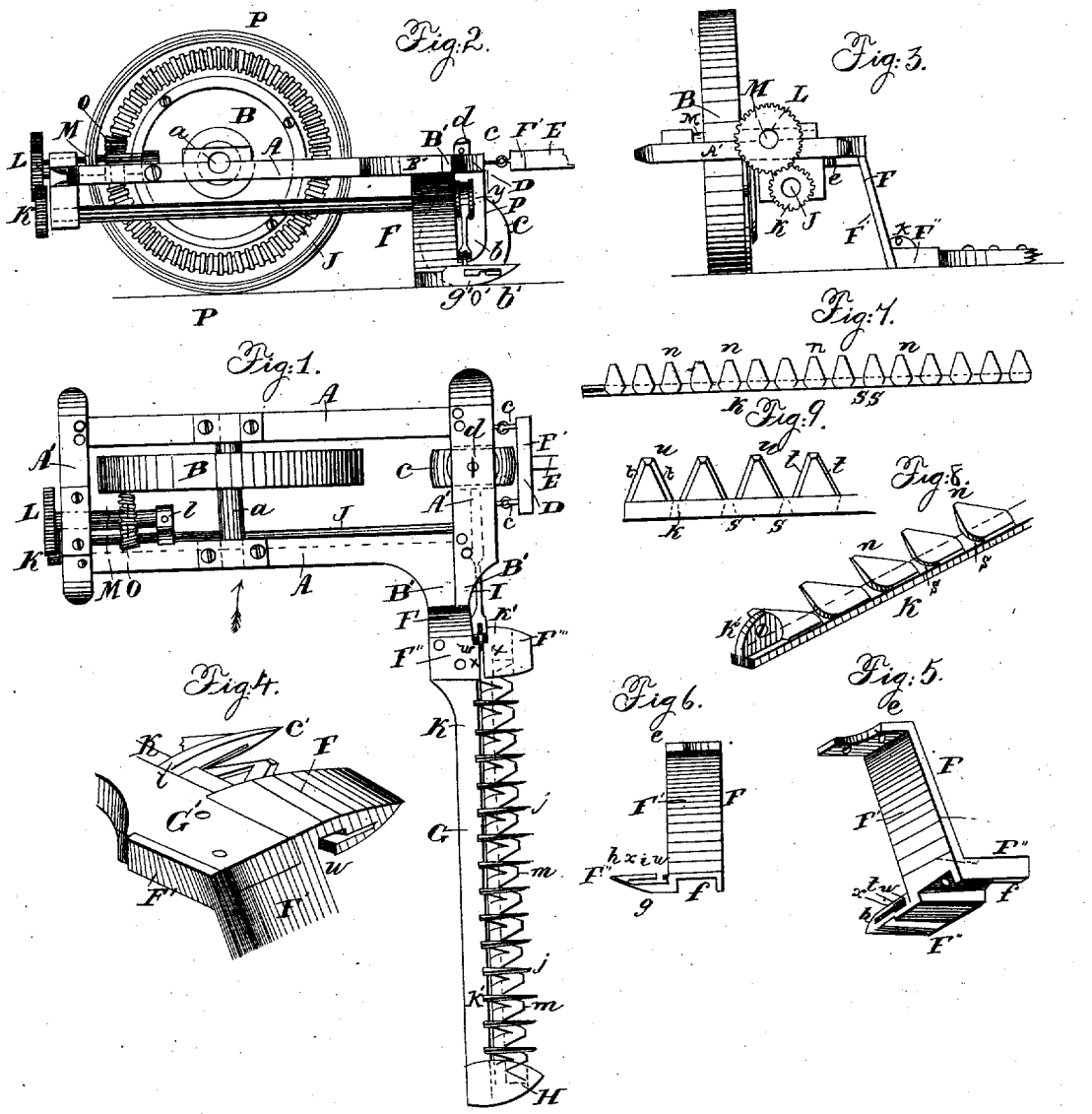
Witnesses
Wm. Yorke & Co.
Louis Lapham
J. H. Dodge
Ass'd of
Philip H. Kells
N. PETERS, PHOTO-LITHOGRAPHER, WASHINGTON, D. C.

UNITED STATES PATENT OFFICE.

THOMAS H. DODGE, OF WASHINGTON, D. C., ASSIGNOR TO P. H. KELLS.

IMPROVEMENT IN HARVESTERS.

Specification forming part of Letters Patent No. 10,671, dated March 21, 1854; Reissue No. 1,221, dated August 13, 1861.

DIVISION No. 2.

*To all whom it may concern:*

Be it known that PHILIP H. KELLS, formerly of Hudson, Columbia county, State of New York, but now residing in Adrian, Lenawee county, State of Michigan, invented certain new and useful Improvements in Harvesters or Mowing-Machines, of which the following is a full, clear, and exact description, reference being had to the annexed drawings, which make a part of this specification, and in which—

Figure 1 is a plan view of a machine, showing one mode of applying the improvements which form the subject of this patent. Fig. 2 represents a side view of the machine, looking in the direction of arrow 1, Fig. 1. Fig. 3 represents a rear view of a part of the machine, showing the large cog-gear and the small pinion-wheel, main wheel, main frame, coupling or shoe piece, and a portion of the finger-beam. Fig. 4 represents a bottom view, in perspective, of a part of the coupling or shoe-piece, and the heel end of the finger-beam. Fig. 5 is a view in perspective of the coupling or shoe-piece detached. Fig. 6 is a side view of the same. Fig. 7 represents a plan view of the cutter-bar with "Kell's improved cutter" attached thereto. Fig. 8 represents a view in perspective of part of said cutter-bar and cutters, and Fig. 9 is a bottom view of four cutters attached to their bar, showing the position of the bevel as respects the cutter and cutter-bar.

That side of the machine next to the standing grass, and on which the finger-beam is arranged, I call the "inside," and that next the cut grass I call the "outside."

In the accompanying drawings, A A A′ A′ represent the main frame, composed of longitudinal and cross pieces properly fastened together. This frame is sustained in the main by a large wheel or rolling support, B, whose axle *a* is supported, and turns in boxes or bearings fastened to the sides of the main frame. The front of the frame is provided with a swivel-wheel, C, whose journal *b* turns in ears which project down from the frame D, whose upper end is swiveled to the front of the frame, as seen at *d*, so that while the main frame is drawn along by the team attached to the tongue E, which projects forward from a cross-piece, E′, hinged to the front of the frame in any suitable manner—in this instance, by dead eyes, as seen at *c*. Wheel C is free to turn in frame D, while in turning the machine, or in case the front of wheel C should happen to strike an angular stone or stump, such front can turn laterally, to pass the same. In this case the wheel-frame D and end *d*, swiveled in the front of the main frame, all turn together.

To the inner front corner of the frame, which is formed by the projecting ends, B′ B′, of the pieces A′ A, is fastened a coupling or shoe piece, F. This coupling or shoe piece is provided, in this instance, with a knee or projection, *e*, at its top or elevated end, by which it is bolted fast to the under side of the projecting part B′ B′ of the main frame, while the coupling or extension part E′ extends down and out toward the standing grass, and terminates in a shoe part, F″, having a recess, *f*, in which to fasten the heel end of the finger-beam, a groove, *g*, for the heel end of the cutter-bar to work in, together with a long narrow slit, *h*, for the cutters to pass through, and an opening, *i*, for the projection *k′* on the heel of the cutter-bar *k* to work through when the machine is in operation.

The front F″ projects forward and up like a shoe or runner, as fully shown in the drawings.

The heel G′ of the finger-beam G is provided with shoulders, whereby, when placed in the recess *f* of the shoe and one or two bolts passed through both, it is held in a firm and substantial manner. (See Fig. 4.)

When the heel of the finger-beam is in place, the lower surfaces of the finger-beam and the part F″ are flush; consequently they both glide over the ground with ease and without danger of catching cut stalks or striking against stones or other similar obstructions.

The outer end of the finger-beam is provided with a shoe, H, having an opening, *g′*, for the cutter-bar to work through, and a narrow slit, *h′*, for the outer cutter to work through.

The mode of operating a pitman-shaft in a mowing-machine has received great attention, since the gearing by which it is driven has to run at a high speed in order to do good work, and consequently the character, position, and arrangement of the gearing are all important in a practical point of view; and the nature of the invention, which forms the subject-matter of this patent, relates more particularly to this subject; and it consists, first, in extending the rear end of the shaft which operates the pitman, and generally termed the "eccentric" or "crank shaft," back of the rear end of the main frame sufficiently far to receive a small pinion-wheel, in combination with extending the rear end of another shaft, whose front end is geared in any proper manner with the main gearing or axle of the machine, back of the rear end of the main frame, sufficiently far to receive a large cog-wheel by which to drive the small pinion-wheel and its shaft.

The nature of the invention consists, secondly, in placing the finger bar or beam in a mowing-machine at the side of the gearing and in front of the driving-wheel, in combination with extending the shaft which operates the pitman back lengthwise of the frame, so that its rear end will project in rear of the main frame sufficiently far to receive a small pinion-wheel, which is driven by a large cog-wheel fast on the rear end of another shaft, which also projects in rear of the main frame for that purpose.

In the drawings, J represents the shaft by which a reciprocating motion is imparted to the cutter-bar K and its cutters by means of the pitman I, the inner end of which is hinged to the piece *k'* on the heel of the cutter-bar, while the other end is connected to or encircles an eccentric on the front end of the shaft, J, as seen at *y*. Shaft J extends longitudinally of the main frame, and is supported in two bearings attached to the frame, one of which is supported by the front of the frame, so as to support said shaft just in rear of the outer end of the pitman and back of the eccentric, while the other bearing is supported by the rear of the frame, so as to sustain the rear end of said shaft, just in front of its small pinion or gear wheel, K, which is on the rear end of said shaft and on the outside of the rear end of the main frame. A large cog-wheel, L, on the rear end of shaft M gears into the small pinion-wheel K. Shaft M is not so long as shaft J, and its bearings are a little higher, as indicated fully in the drawings.

The front end of shaft M is supported by a bearing projecting out from a part of the main frame, and the axis of said shaft is in the same or nearly the same horizontal plane as the axis of the main axle *a*, and at right angles thereto, or nearly so, while its rear end extends a little back of the main frame. This arrangement of the short shaft M enables its small bevel-gear O to gear into the large bevel-gear P near its center, or in a horizontal line passing through the axis of motion of said large bevel-gear and the axle or journal *a*, upon which the main frame rests.

The large bevel-gear is fastened to the side of wheel B, which is fast on an axle, *a*, so that when the axle or journal *a* turns or revolves the large bevel-gear P revolves, thus giving motion to small bevel-gear O, shaft M and large cog-wheel L, which in turn causes the small pinion or cog-wheel K and the eccentric shaft J to revolve with great velocity, whereby the proper reciprocating motion is imparted to the cutter-bar and cutter through the pitman I. In lieu of an eccentric, the old and well-known crank may be used to give motion to the pitman and cutter.

It will thus be seen that the bearings of the short shaft M, whose small bevel-gear receives motion from the large bevel-gear, are nearly in the same horizontal plane with the bearings of the main axle and the main frame; consequently the bearings of said shaft can be as permanently fastened to the main frame as the bearings of the main axle or journal, and hence said shaft or its gears are not liable to be thrown out of line when in motion.

Again, by use of the rear gears, L and K, combined as shown, the necessary speed of the shaft which operates the pitman is obtained in a very simple and effective manner. The gearing, being compact and removed to the rear and center of the machine, is not liable to get out of order, while the rear cog-gears can be removed and replaced by simply removing the splines by which they are fastened to their respective shafts, and that too without necessarily removing the shafts or disturbing their bearings. Again, by the arrangement of the finger-beam, as shown, and the use of a long eccentric or crank-shaft all the advantages due to machines having the finger-bar in front, as well as those due to rear gearing and a long crank-shaft, are obtained. So long as the large bevel-gear is combined with the main axle of a mowing-machine, so as to turn with it and be concentric with the axis of said shaft or journal, it is not material, so far as the improvements which form the subject-matter of this patent are concerned, what particular mode is adopted of combining the main supporting wheel or wheels with said axle, in order to give motion to the same and said bevel-gear. By "rear gearing" is meant the cog gears K and L.

Some parts of the machine are more fully described in other patented divisions of even date herewith, and therefore a more detailed description is not deemed necessary.

Having described one mode of applying said improvements to practical use, what is claimed under this patent as the invention of said PHILIP H. KELLS is—

1. Extending the rear end of the shaft which operates the pitman and cutter of a mowing-machine back of the rear end of the main frame and providing it with a small pinion-wheel, in combination with extending the rear end of another shaft whose front end is geared with the driving mechanism back of the rear end of said frame, and providing it with a large cog-wheel to gear into said pinion-wheel, whereby when the machine is drawn forward a rapid motion is imparted to the pinion-wheel and its shaft to operate the pitman and cutters, and whereby said rear gearing is brought near the center of the rear of the machine and in a compact form, and also so that said rear gears can be readily examined and replaced without necessarily removing their shafts or disturbing the bearings thereof.

2. Placing the finger-bar in a mowing-machine at the side of the gearing and in front of the driving-wheel, in combination with the use of a long eccentric or crank shaft and rear gearing, arranged as described.

In witness whereof I have hereunto subscribed my name.

THOMAS H. DODGE,
*Assignee of Philip H. Kells.*

In presence of—
WM. YORKE AT LEE,
RANDOLPH COYLE, Jr.